(12) United States Patent
Bergman et al.

(10) Patent No.: US 7,130,805 B2
(45) Date of Patent: Oct. 31, 2006

(54) METHOD AND APPARATUS FOR GENERATING PROGRESSIVE QUERIES AND MODELS FOR DECISION SUPPORT

(75) Inventors: Lawrence D. Bergman, Mt. Kisco, NY (US); Yuan-Chi Chang, White Plains, NY (US); Chung-Sheng Li, Ossining, NY (US); John R. Smith, New Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 10/047,863

(22) Filed: Jan. 16, 2002

(65) Prior Publication Data

US 2002/0099689 A1    Jul. 25, 2002

Related U.S. Application Data

(60) Provisional application No. 60/263,026, filed on Jan. 19, 2001, provisional application No. 60/263,039, filed on Jan. 19, 2001.

(51) Int. Cl.
*G06F 17/60* (2006.01)
(52) U.S. Cl. .................................. 705/1; 707/4; 707/6
(58) Field of Classification Search .................. 705/2, 705/3, 10, 1; 702/95; 706/45; 455/3.06; 707/100, 1–10
See application file for complete search history.

(56) References Cited

U.S. PATENT DOCUMENTS 5,953,704 A * 9/1999 McIlroy et al. ................. 705/2
6,421,622 B1 * 7/2002 Horton et al. ................ 702/95
2002/0111134 A1 * 8/2002 Salurso et al. ............. 455/3.06
2003/0130973 A1 * 7/2003 Sumner, II et al. ........... 706/45
2003/0154121 A1 * 8/2003 Konnersman ................ 705/10

OTHER PUBLICATIONS

"The JPEG2000 Still Image Coding System: an Overview", Christopoulos et al., IEEE Transactions on Consumer Electronics, vol. 46, No. 4 Nov. 2000, pp. 1103-1127.
"Onboard Science Processing and Buffer Management for Intelligent Deep Space Communications", Manduchi et al.,2000 IEEE Aerospace Conference Proceedings, (Cat. No. 00TH8484), pp. 329-339, vol. 1.
"Progressive Transmission of Images over Memoryless Noisy Channels," Chande et al., IEEE Journal on Selected Areas in Communications, vol. 18, No. 6 pp. 850-860, Jun. 2000.

* cited by examiner

*Primary Examiner*—Charles Rones
*Assistant Examiner*—Neveen Abel-Jalil
(74) *Attorney, Agent, or Firm*—Ido Tuchman; Anne Dougherty

(57) ABSTRACT

The invention provides a next generation decision support system that includes highly adaptive sensors, transport, and models to enable time critical decision making. The decision support model of the system is progressive so that not all input parameters need to be available to produce model prediction output. Input parameters of the model with the largest first order derivative values are given highest priority in data acquisition and transmission. The parameters acquired at the sensors are stored in progressive data representation formats, which later on are progressively transmitted to the decision support server. Progressive data representation, progressive transmission, and progressive model are thus three key elements that need to be integrated together. The present invention presents a method and an apparatus that form an optimized process including the three elements subject to the decision making utility function.

10 Claims, 4 Drawing Sheets

METHOD AND APPARATUS FOR GENERATING PROGRESSIVE QUERIES AND MODELS FOR DECISION SUPPORT

CROSS-REFERENCE TO RELATED APPLICATION

This application claims the benefit of U.S. Provisional Patent Application Ser. Nos. 60/263,026 and 60/263,039, each filed Jan. 19, 2001, and each of which is incorporated herein by reference. This application is related to U.S. Pat. No. 6,915,239, filed contemporaneously herewith and incorporated herein by reference.

FIELD OF THE INVENTION

The present invention relates to distributed information systems and, more particularly, to data acquisition and transmission for decision support models. It details a method and an apparatus which optimize on a decision-support value function of progressively acquired and transmitted data.

BACKGROUND OF THE INVENTION

Today's distributed information gathering systems for decision support are often designed and parameterized with fixed targets, fixed precision, fixed transmission intervals, and fixed decision models. Such systems are good for constant surveillance of a fixed phenomenon. For example, the NASA Solar and Heliospheric Observatory (SOHO) satellite launched in 1995 observes the Sun and the solar wind. SOHO takes photos of the Sun at various spectra at fixed time intervals (avg. 18 mins) and transmits the digitized signals to ground stations at a fixed resolution for scientific studies. Science models are then built with the parameters based on SOHO specifications. For example, a model to detect corona mass ejection from a sequence of photos of the Sun assumes SOHO specification of 18 min acquisition intervals and 512 by 512 pixel resolution. Studies and model-building are largely one-way with no possibility of feeding back instructions to the satellite in real time. Scientists thus cannot instruct SOHO to focus on a corner of the Sun for better observation of corona mass ejection, for example.

As new generations of information gathering systems evolve, sensors are better equipped with processing and communication capabilities to receive and process instructions. Those intelligent sensors can be instructed to auto-focus on the areas of interest and perform on-line retargeting. Such capabilities are crucial for observing fast-changing phenomena such as forest fires and volcano eruptions. Information collected can be used in real-time decisions for early warning and disaster relief. Nevertheless, the new generation sensors continue to have limitations in computational power, storage space, electricity usage, communication bandwidth and so on. These limitations pose constraints on the whole end-to-end information gathering and decision support system.

For time critical missions, the main objectives of the information gathering and decision support systems are:
1. Achieve the highest model prediction quality when all the information required is returned and analyzed at the server (e.g. ground station or decision making assistant);
2. Achieve the highest model prediction quality at any time when data is only partially returned to the server.

The first objective is stemmed from traditional decision support systems that are built on acquiring complete sets of data. The second objective addresses the need of time urgency and emphasizes that decisions may be made based on partial information—the best prediction from partially available data. As new data streams in, the server system may refine its predictions continuously and adaptively.

There are many challenges to constructing a continuously adaptive decision support system. Due to various acquisition, processing, storage and transmission limitations, it may be impossible to acquire the entire collection of data at the highest resolution possible. Processing constraints pose difficulties in processing the data in time and transmitting the results to the decision maker. Potentially huge amounts of data (1 TB a day from Terra Satellite) are a burden to its storage, search and retrieval.

The next generation decision support system must achieve the above objectives given the limitations. Clearly the traditional approach is infeasible in most occasions. The new system must be adaptive in resource (processing, storage, transmission) consumption and only use resources to obtain maximal model prediction quality. The present invention is a proposed solution to the development of the next generation decision support system.

SUMMARY OF THE INVENTION

The present invention is directed to method and apparatus for generating progressive queries and models for decision support. Particular aspects of the present invention are related to (1) progressive representation for targeted data acquisition; the targeted data may be acquired progressively, or all at once, and stored in progressive representation formats. (2) progressive transmission to prioritize subsets of data based on its contribution to model prediction quality; (3) a progressive model that accepts partial input to generate prediction and confidence; and (4) end-to-end optimization for decision making utility, including data acquisition, transmission, and model.

More particularly, the present invention includes a method for use in an apparatus for sensing parameters and controlling the transfer of data representing such sensed parameters, the apparatus having limited data computation and storage capability, located remotely from a base computing station having substantially greater data computation and storage capability, the transmission control apparatus including a data acquisition controller which controls the operation of one or more physical parameter sensors and a data transmitter which transmits data representing parameters sensed by the one or more parameter sensors to the base station, the method comprising: determining an initial relative utility of parameter data that can be sensed by the apparatus; directing the data acquisition controller to sense data describing one or more physical parameters determined to have relatively highest utility; assigning a transmission priority to the sensed data; directing the data transmitter to transmit the sensed data to the base station given the assigned priority; and determining, in response to feedback from the base station, a subsequent relative utility of parameter data for use in subsequent data sensing and transmission.

In a further aspect, the invention includes an apparatus for sensing parameters and for controlling the transfer of data representing such sensed parameters, the apparatus having limited data computation and storage capability and being located remotely from a base computing station having substantially greater data computation and storage capability, the apparatus comprising: a data acquisition controller which controls the operation of one or more physical parameter sensors; a data transmitter which transmits data representing parameters sensed by the one or more parameter sensors to the base station; and an in-situ progressive decision support module which directs the data acquisition controller to obtain data representing one or more physical parameters determined to have relatively highest utility to a decision maker given processing constraints of the control apparatus, and which assigns a transmission priority to such data and directs the data transmitter to transmit such data to the base station given the assigned priority, the in-situ progressive decision support model including means for receiving feedback from the base station to adjust the relative utility of data describing physical parameters for use in subsequent data sensing and transmission.

DETAILED DESCRIPTION OF PREFERRED EMBODIMENTS

Figure 1:
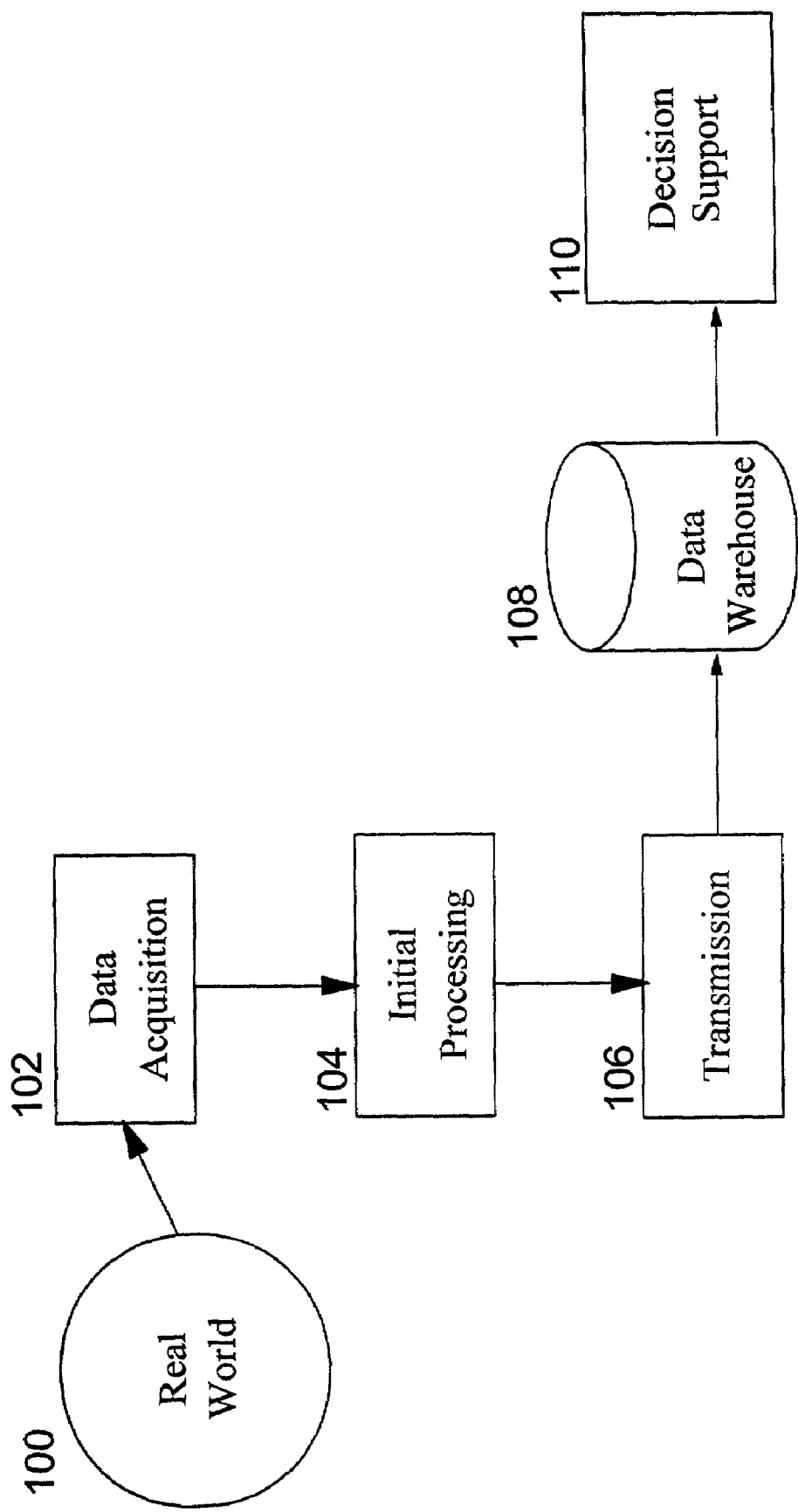
FIG. 1 is a flow diagram of an exemplary prior art data gathering and decision support system.

The present invention is constructed upon three key elements: progressive data representation, progressive transmission, and progressive models. Progressive data representation, a representation format that allows multiple resolution retrieval with minimal redundancy, is based on signal processing properties such as wavelet, Discrete Cosine Transform (DCT), and Flashpix. In U.S. Pat. Nos. 5,734,893 and 6,326,965, and commonly owned and copending U.S. patent application Ser. No. 09/288,580, filed Apr. 8, 1999, solutions were proposed to partition data in the time, space, and frequency domains. A subset of data partitions may be progressively reconstructed in different fidelity. Progressive data representation has been applied in industry standards. The JPEG2000 standard, for example, uses a progressive representation based on wavelet. (C. Christopoulos, et al., "The JPEG2000 still image coding system: an overview," IEEE Trans. Consum. Electron. (USA) Vol.46, No.4 November 2000 P1103–27).

Progressive transmission refers to the process of prioritizing data blocks in a transmission sequence. The data blocks may correspond to partitions in a progressive data representation, in which priorities may be determined by maximizing fidelity. Progressive transmission of images, for example, was discussed in V.Chande, et al., "Progressive transmission of images over memoryless noisy channels," IEEE J. Sel. Areas Commun. (USA) Vol.18, No.6 June 2000P850–60, although applications of progressive transmission are not limited to image communications. Alternatively, priorities of data blocks may also be assigned by maximizing the utility to the receiver. See for example, R. Manduchi, et al., "Onboard science processing and buffer management for intelligent deep space communications," 2000 IEEE Aerospace Conference. Proceedings (Cat. No.00TH8484) 2000 P329–39 vol. 1, which discusses maximizing invention, priorities of data blocks are assigned using the greedy heuristic by picking the block which contributes to the increase of the utility most.

Progressive model, also referred to herein as progressive decision support, refers to the adaptability of a model to the absence of one or more input variables or the degraded precision of decision makers. A simple linear model in the form of $y=a1*x1+a2*x2+a3*x3$ may be transformed into a progressive linear model by omitting the smallest coefficients. In the above formula, y is the output variable of the model. $x1$, $x2$, and $x3$ are the three input variables of the model, $a1$, $a2$, and $a3$ are linear coefficients associated with the input variables. Assume $a3$ is much smaller than $a1$ and $a2$. The progressive linear model can be written as $y'=a1*x1+a2*x2$. The value of $y'$ will not be the same as the value of y with the same inputs. However, when transmission or processing capacities are not available for all three input variables, the progressive model would suggest that values of variables $x1$ and $x2$ should be acquired and transmitted first. The present invention is distinct from traditional information gathering and decision support systems in its combined optimization of progressive data representation and transmission, given a progressive model, to achieve the highest utility to the decision maker. A progressive model is derived from an original, non-progressive model with a utility function characterizing the usefulness of inaccurate model outputs. Various applications may value accuracy differently. In the most extreme case, model outputs must be 100% accurate and only the original, non-progressive model may be used. Other applications may not demand 100% accurate data and thus progressive models can be derived. The derivation depends on the specific structure of the model. In the case of a linear regression model, its progressive model is derived simply by omitting those input variables with smaller coefficients. A progressive model decides what decision variables are most needed when processing speed, data acquisition, or transmission capacity are limited. The data associated with these variables is given high priority in progressive transmission. The data is acquired and stored in progressive representation formats such as JPEG2000.

FIG. 1 illustrates the workflow of data gathering for a decision support process according to the prior art. A data acquisition module (102) first samples parameters in the real world (100) at pre-determined parametric values and generates corresponding digital signals. Initial processing (104) collects the digital signals and rearranges them amenable for transmission, such as by compressing the data. A transmission module (106) moves data bits to a data warehouse (108) for storage and archiving. Finally, a decision support model (110) is run against data in the warehouse to generate model predictions for human decision makers. Among the modules in this prior art end-to-end system, there has heretofore been no feedback loop based on the decision support model.

Figure 2:
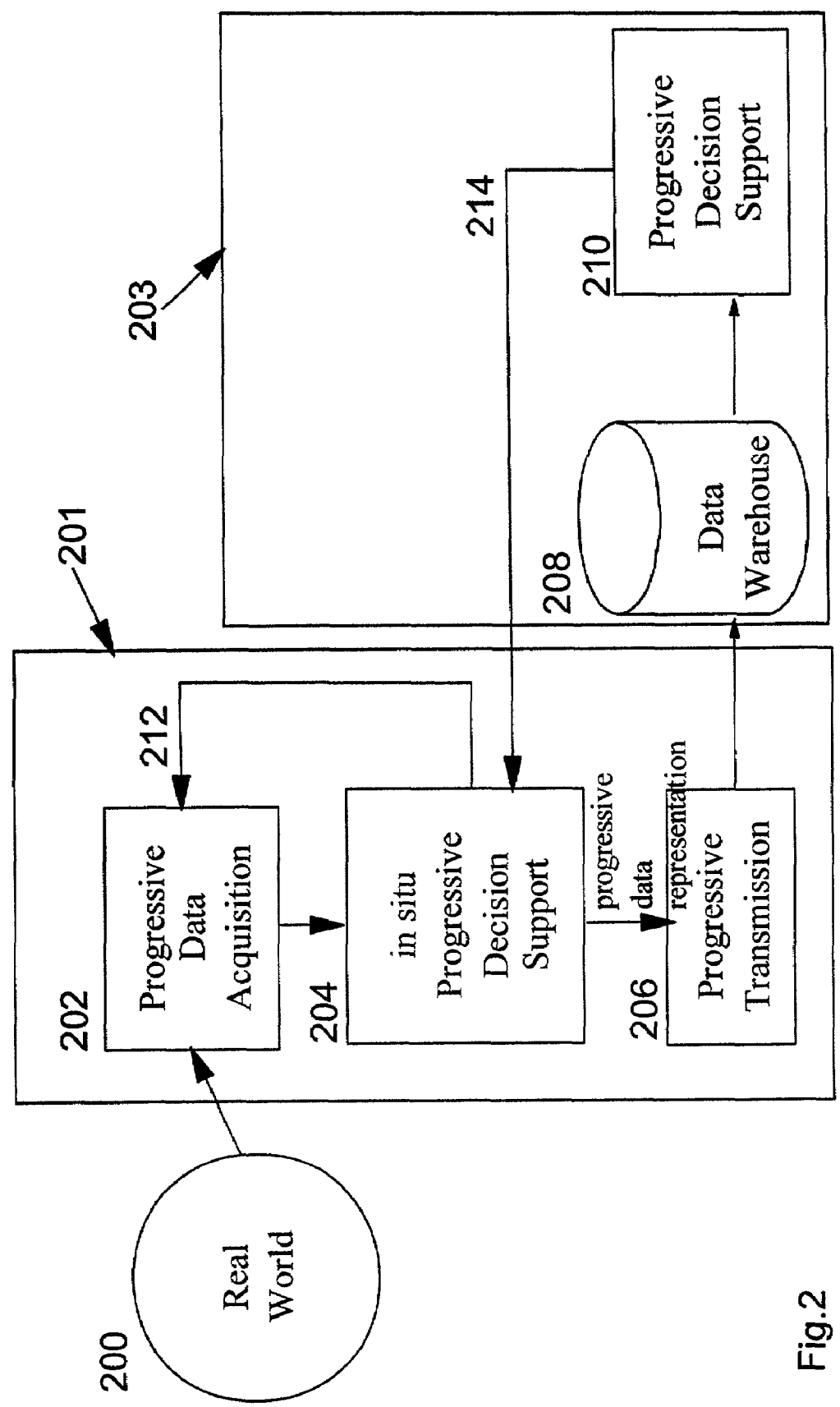
FIG. 2 is a flow diagram of a decision support system in accordance with the invention.

FIG. 2 illustrates the workflow for a decision support system in accordance with the present invention. The system includes a remote parameter sensing system (201), such as a data-gathering satellite, weather station environmental sensor, or the like, with limited data storage, computation, and transmission capability, and a base station (203) equipped with substantially greater storage and computational capability than sensor (201). System (201) may include various parameter sensors for detecting any number of physical phenomena, such as sound, temperature, moisture, light, etc. In FIG. 2, the individual parameter sensors are encompassed within progressive data acquisition module (202). In addition to parameter sensors, module (202) includes data acquisition control circuitry for varying the operation of individual sensors, for instance with regard to a desired target of data acquisition, the frequency at which data should be collected, and the resolution of the data. The data acquisition control circuitry varies the operation of the sensors in response to control signals received from an in-situ progressive decision support module (204).

In-situ module (204) may be implemented as a suitably programmed computing device operating on board the sensing system (201), and operates as follows. Initially, the in-situ module will have stored within its limited storage capacity a model, such as a linear regression model, describing a condition of interest to a decision maker, such as the possibility of fire breaking out in a region of interest. In order to determine how best to utilize system (201)'s parameter sensors, in-situ module (204) will determine which parameters of the model will, given the computational, storage and transmission limitations of the system (201), provide the most useful information for the decision maker. For example, the in-situ progressive decision support module (204) may be programmed to select parameters whose reduced measurement error will increase accuracy most. Let a detailed progressive model be expressed as $y=f(x\_i)$, where y is the output parameter and $x\_i$ is the ith input parameter. Assuming there are a total of N input parameters, i varies from 1 to N. The selection criterion for progressive acquisition is to choose the $x\_i$ which maximizes the first order derivative of y over $x\_i$. Minimizing the acquisition error of $x\_i$ contributes to the minimization of overall model output error most. For example, the progressive model is a linear model in the form of $y=200*x\_1+2*x\_2+1*x\_3$. The first order derivative of $x\_1$ equal to 200 is the largest. Progressive acquisition thus will focus on $x\_1$ initially to minimize the acquisition error. $x\_2$ has the next largest derivative and the progressive acquisition will get to $x\_2$ following the completion of $x\_1$. Finally, $x\_3$ is acquired. Alternatively, it may be that the cost of measuring or transmitting one or more of the highest ranked parameters may be too expensive, in which case parameters lower on the sorted list may be selected instead.

Once in-situ module (204) has selected one or more parameters for measurement, it directs data acquisition module (202) to obtain the desired information and to return it to in-situ module (204), where it is temporarily stored. In-situ module (204) will then assign a label to the data associated with each measured parameter and will pass the measured data, along with the label, to progressive transmission module (206) for transmission to base station (203). The assigned label represents a transmission priority for the data to which it is attached. The transmission module (206) will transmit data to the base station (203) in accordance with the assigned priority levels. Partial, progressively transmitted data is stored in a data warehouse (208) at base station (203) for storage and archiving.

Transmission priority is based on the data's utility for transmission in (206). The utility of an input parameter is directly related to the utility of a progressive model. It is preferred that the priority assigned to the acquired data is identical to the priority assigned for its progressive acquisition. The parameters acquired first are also transmitted first. In the linear model example above, $x\_1$ is assigned the highest priority in both progressive acquisition and transmission because it contributes to the model accuracy most.

The last step is that a progressive decision support module (210) executes a more detailed model than the one utilized by in-situ module (204), using the substantially greater computing capability of the base station, against the partial data stored in data warehouse (208) to generate model predictions and confidence intervals. In addition to data received from sensor (201), decision support module (210) may utilize data gathered from other sources or static data residing in the data warehouse. Similarly, the more complex model used by module (210) may include parameters not measured or measurable by sensor (201), but which may nevertheless be relevant to the decision making process. Progressive decision support module (210) may implemented as a suitably programmed computing device.

Depending on the complexity of models, predictions and confidence intervals can be found through known sensitivity analysis techniques like Monte Carlo simulation. For a linear progressive model like $y=200*x1+2*x2+1*x3$, the model prediction output is computed by substituting the measured data values of x1, x2, and x3. The confidence interval is computed by the maximum possible errors of x1, x2, and x3. Assuming each has a 10% error, the confidence interval is $200*0.1+2*0.1+1*0.1=20.3$. Making the confidence interval small increases the utility of the model, which is described in FIG. 3. In this example, decreasing the error of x1 from 10% to 1% has a significant effect on the reduction of confidence interval. x1 is therefore chosen to be acquired and transmitted first. .

Instructions processed in the progressive decision support module (210) and in-situ progressive decision support module (204) aim to achieve the highest model prediction accuracy possible at the time of evaluation. Model prediction accuracy is measured by a utility function U(t) in FIG. 3. U(t) may be expressed as $[1-exponential(-A(t))]$ where A(t) is the measured model output accuracy at time t. A(t) is usually a montonically increasing function of time and it is inversely proportional to the confidence interval. The bigger the confidence interval, the smaller the model accuracy. t represents time starting at the instant the decision support model is activated. Different data acquisition and transmission actions lead to different model prediction quality, which may raise or reduce utility.

Figure 3:
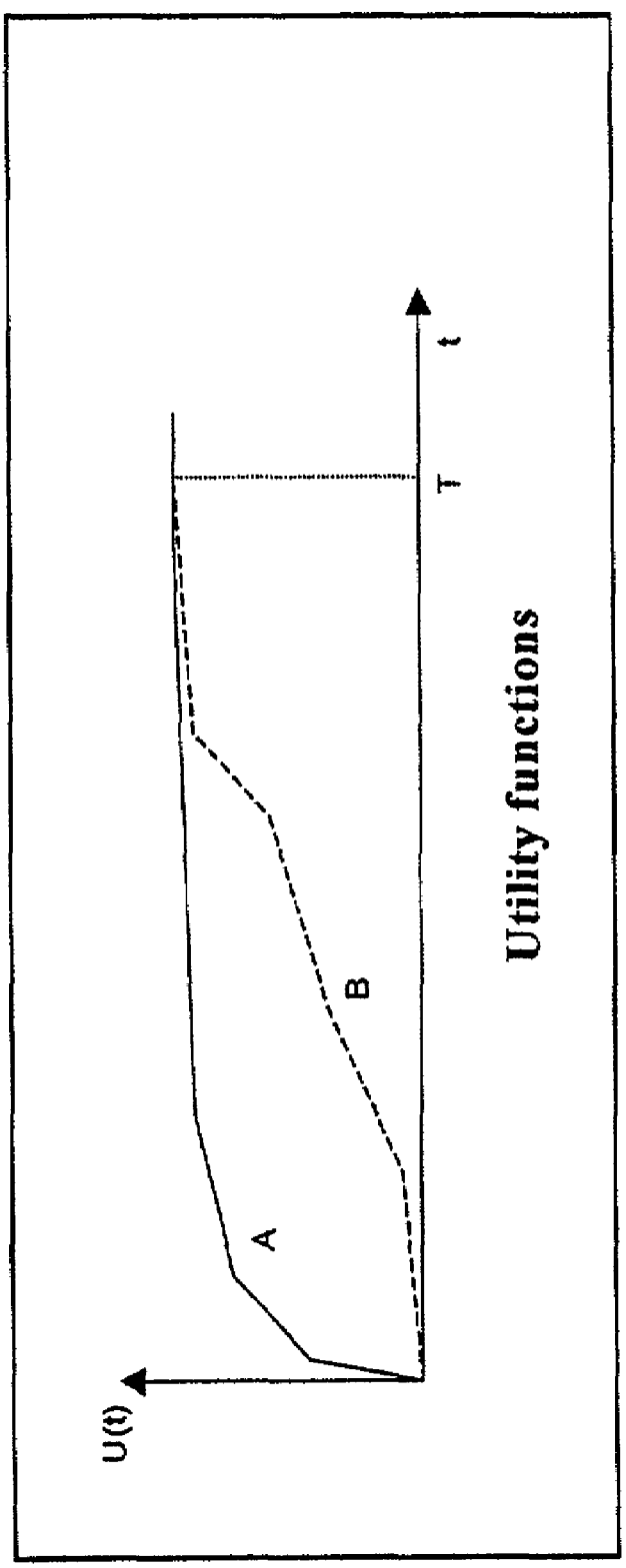
FIG. 3 is a graphical illustration of two utility curves A and B over time interval T.

As shown in FIG. 3, actions leading to curve A in the utility graph are preferred over those leading to curve B. The objective of utility maximization is to seek out the optimal combinations of progressive acquisition, progressive transmission, and progressive model outputs using the workflow described in FIG. 2. The optimization process starts with the progressive decision support model (210) and the utility function u(t). The objective is to maximize the utility, which requires the maximization of model accuracy and the minimization of confidence intervals. Input parameters that contribute to the reduction of confidence intervals most are prioritized highly by in-situ module (204) for data acquisition (202) and transmission (206). For example, if the progressive model used by module (210) is linear, the input parameters with the largest coefficients are prioritized over those with smaller coefficients.

The output of decision support module (210) is fed back to in-situ decision support module (204) in the form of a revised model with parameter weights adjusted to reflect the modified utility of parameters in light of the partial data gathered to date by sensor (201), and other data to which module (210) has access. Using the modified model weights, in-situ module will reprioritze parameters for measurement and transmission, and provide modified data gathering instructions to data acquisition module (202), and modified transmission priority instructions to transmission module (206) accordingly.

Figure 4:
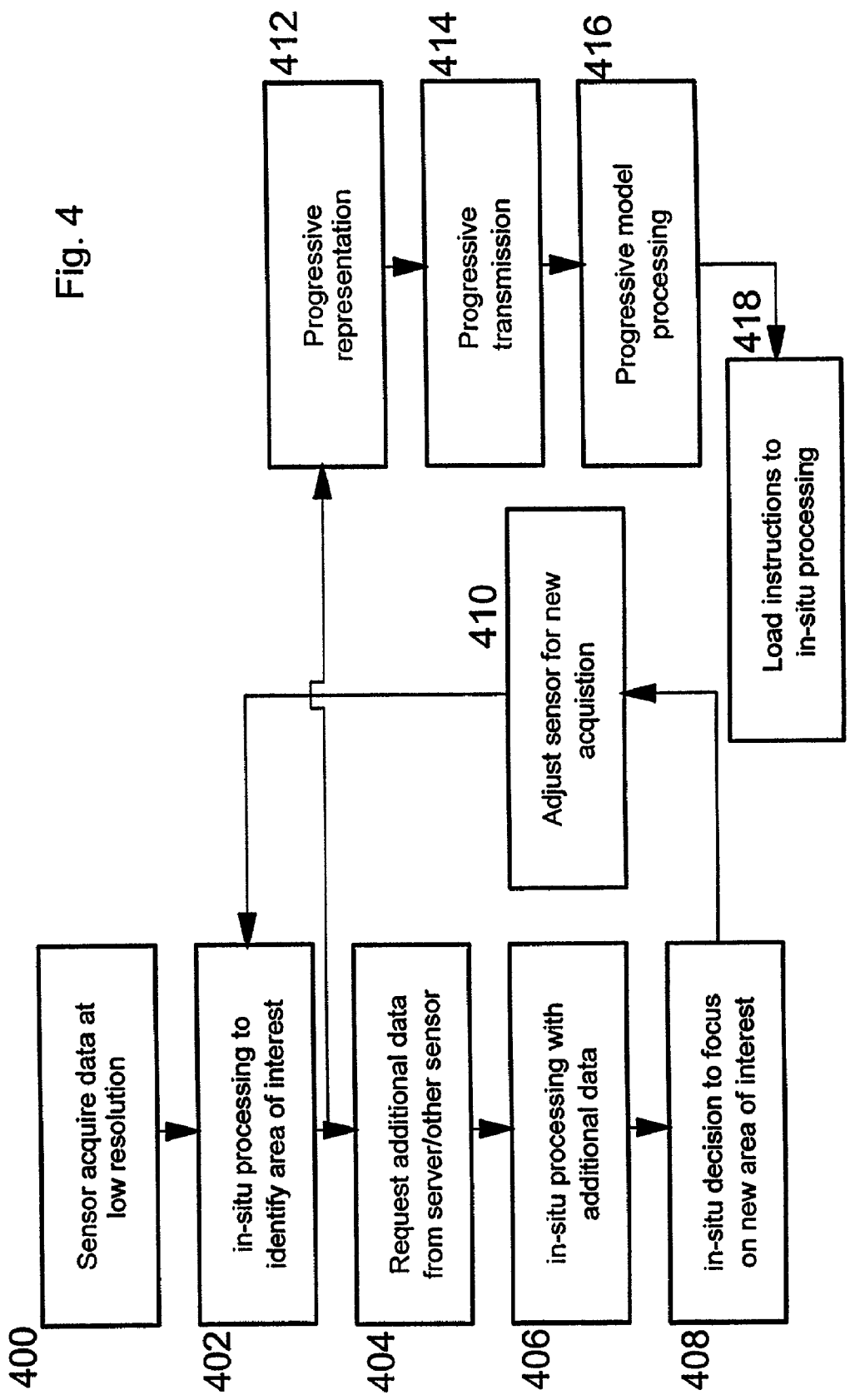
FIG. 4 is a flow diagram of the operation of a system with progressive representation, acquisition, transmission and modeling modules, in accordance with the invention.

FIG. 4 illustrates a flow diagram of an exemplary system with progressive representation, acquisition, transmission and modeling modules that allows end-to-end optimization for decision making. The example given in the description below assumes a forest fire is to be detected, for ease of explanation of the invention. However, the present invention extends beyond the scope of detection of forest fires. In accordance with this embodiment of the invention, first, sensor(s) acquire data at a low resolution (400). This could be a satellite photo of the continental United States, for example. In-situ processing is conducted to identify areas of interest (402), say possibly hot spots in the satellite picture indicating possible forest fire, volcano, or city lights. Step (404) then requests additional data from a server (ground station) or other sensors in the identified areas of interest. A sequence of actions at the server/other sensors is then triggered, including (412), (414), (416) and (418). The requested additional data is stored progressively to allow fast retrieval (412), say land cover (city, forest, water, barren) maps. The data is progressively transmitted in prioritized order (414). In this example of detecting forest fires, locations of forests are transmitted first, followed by locations that represent city, barren and water. This order is pre-determined at the time when the forest fire model was built. A progressive model is used to predict the probability of forest fire outbreak (416). The probability is higher, for example, if the rainfall in the past seven days at the forest is zero. A progressive model can generate a prediction without the full knowledge of all variables. The high probability locations need further, more accurate examination. The coordinates of such locations are loaded into the in-situ processing modules (418). At this point, (406) in-situ processing receives instructions and additional data from the data warehouse (e.g. ground station) and other sensors. The sensor is adjusted to focus on the identified region of interest for new acquisition (410). The sensor may zoom in or choose a separate set of instruments to acquire new data.

FIG. 4 emphasizes the sequence of actions to allow progressive acquisition, representation, transmission, and modeling to work together.

The selection of regions of interest is based on the criteria explained in FIG. 3. The optimization objective is to obtain high utility as early as possible. In the forest fire detection example, quickly locating possible fire outbreak regions and eliminating false alarms of city lights and volcano activities will achieve the objective. The concrete steps in FIG. 4 embody the process of achieving the objective.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

The invention claimed is:

1. A method usable in an apparatus for sensing parameters and controlling the transfer of data representing such sensed parameters, the apparatus having limited data computation and storage capability, located remotely from a base computing station having substantially greater data computation and storage capability, the apparatus including a data acquisition controller which controls the operation of one or more physical parameter sensors and a data transmitter which transmits data representing parameters sensed by the one or more parameter sensors to the base station, the method comprising:

determining an initial relative utility of parameter data from the physical parameter sensors that is sensed by the apparatus;

directing the data acquisition controller to sense data describing one or more physical parameters determined to have relatively highest utility;

assigning a transmission priority to the sensed data;

directing the data transmitter to transmit the sensed data to the base station given the assigned priority;

determining, in response to feedback from the base station, a subsequent relative utility of parameter data usable in subsequent data sensing and transmission; and wherein the determination of an initial relative utility of parameter data is based on a model describing the utility of such data to a decision maker; and wherein the determination of an initial relative utility is performed by taking the first order derivative of the model and ranking the result; and transmitting by the data transmitter subsequent sensed data describing the one or more physical parameters according to the subsequent relative utility.

2. An apparatus for sensing parameters and for controlling the transfer of data representing such sensed parameters, the apparatus having limited data computation and storage capability and being located remotely from a base computing station having substantially greater data computation and storage capability, the apparatus comprising:

a data acquisition controller which controls the operation of one or more physical parameter sensors and stores acquired data in progressive data representation format;

a data transmitter which transmits data representing parameters sensed by the one or more parameter sensors to the base station;

an in-situ progressive decision support module which directs the data acquisition controller to obtain data representing one or more physical parameters determined to have relatively highest utility to a decision maker given processing constraints of the control apparatus, and which assigns a transmission priority to such data in its progressive representation format and directs the data transmitter to transmit such data to the base station given the assigned priority, the in-situ progressive decision support model including means for receiving feedback from the base station to adjust the relative utility of data describing physical parameters usable in subsequent data sensing and transmission;

wherein the in-situ progressive decision support module makes use of a model describing a condition of interest to a decision maker, the model including one or more parameters measurable by the parameter data sensor; and wherein the in-situ progressive decision support module determines parameters for which data is to be gathered by taking the first order derivative of the model and ranking the result.

3. An apparatus for sensing parameters and for controlling the transfer of data representing such sensed parameters, the apparatus having limited data computation and storage capability and being located remotely from a base computing station having substantially greater data computation and storage capability, the apparatus comprising:

a data acquisition controller which controls the operation of one or more physical parameter sensors and stores acquired data in progressive data representation format;

a data transmitter which transmits data representing parameters sensed by the one or more parameter sensors to the base station;

an in-situ progressive decision support module which directs the data acquisition controller to obtain data representing one or more physical parameters determined to have relatively highest utility to a decision maker given processing constraints of the control apparatus, and which assigns a transmission priority to such data in progressive data representation format and directs the data transmitter to transmit such data to the base station given the assigned priority, the in-situ progressive decision support model including means for receiving feedback from the base station to adjust the relative utility of data describing physical parameters usable in subsequent data sensing and transmission;

wherein the in-situ progressive decision support module makes use of a model describing a condition of interest to a decision maker, the model including one or more measurable by the parameter data sensor;

wherein the model having one or more variables representing measurable parameters; and wherein the in-situ progressive decision support module determines parameters for which data is to be gathered by taking the first order derivative of the model and ranking the result.

4. The apparatus of claim 3, wherein the in-situ progressive decision support module assigns a transmission priority to gathered data by taking the first order derivative of the model and ranking the result.

5. The apparatus of claim 3, where the model is a linear regression model whose one or more variables are associated with weights indicating the relative utility of the parameter to the decision maker.

6. The apparatus of claim 5, wherein the apparatus further comprises:

means responsive to the feedback received from the base station for modifying the weights associated with measurable parameters;

means for directing the data acquisition controller to cause further parameter data to be gathered, the further parameter data to be gathered being dependent on changes in utility of such parameter data as indicated by the modified weights; and means for assigning a modified transmission priority to such further parameter data and directing the data transmitter to transmit such parameter data to the base station given the modified transmission priority, the modified transmission priority being dependent on changes in utility of such parameter data as indicated by the modified weights.

7. The method of claim 3, wherein the model comprises one or more variables representing measurable parameters.

8. The apparatus of claim 7, where the model is a linear regression model whose one or more variables are associated with weights indicating the relative utility of the parameter to the decision maker.

9. The method of claim 8, further comprising:

modifying, in response to the feedback received from the base station, the weights associated with measurable parameters, directing the data acquisition controller to cause further parameter data to be sensed, the further parameter data to be sensed being dependent on changes in utility of such parameter data as indicated by the modified weights; and assigning a modified transmission priority to such further sensed data and directing the data transmitter to transmit such parameter data to the base station given the modified priority, the modified transmission priority being dependent on changes in utility of such parameter data as indicated by the modified weights.

10. The method of claim 7, wherein transmission priority is determined by taking the first order derivative of the model and ranking the result.

* * * * *